United States Patent
Kikuchi

(10) Patent No.: US 9,372,567 B2
(45) Date of Patent: Jun. 21, 2016

(54) DISPLAY DEVICE, DISPLAY METHOD, AND RECORDING MEDIUM STORING DISPLAY PROGRAM

(71) Applicant: FUJITSU LIMITED, Kawasaki-shi, Kanagawa (JP)

(72) Inventor: Taro Kikuchi, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 282 days.

(21) Appl. No.: 13/748,338

(22) Filed: Jan. 23, 2013

(65) Prior Publication Data

US 2013/0278515 A1    Oct. 24, 2013

(30) Foreign Application Priority Data

Apr. 19, 2012   (JP) .................. 2012-096051

(51) Int. Cl.
G06F 3/041 (2006.01)
G06F 3/0485 (2013.01)
G06F 3/0488 (2013.01)

(52) U.S. Cl.
CPC ............ *G06F 3/0412* (2013.01); *G06F 3/0485* (2013.01); *G06F 3/04883* (2013.01)

(58) Field of Classification Search
None
See application file for complete search history.

(56) References Cited

U.S. PATENT DOCUMENTS

| 6,535,233 B1* | 3/2003 | Smith ........................ 715/856 |
| 8,487,896 B1* | 7/2013 | Brown et al. .............. 345/173 |
| 2010/0289826 A1* | 11/2010 | Park et al. ................. 345/676 |
| 2011/0099509 A1 | 4/2011 | Horagai |
| 2011/0102353 A1* | 5/2011 | Kim et al. .................. 345/173 |
| 2012/0098868 A1* | 4/2012 | Nagasaka ................... 345/684 |
| 2012/0105357 A1* | 5/2012 | Li et al. ..................... 345/174 |
| 2012/0300123 A1* | 11/2012 | Lares ........................ 348/441 |
| 2013/0222302 A1* | 8/2013 | Savard ....................... 345/173 |

FOREIGN PATENT DOCUMENTS

| JP | 63-206827 A | 8/1988 |
| JP | 07-311046 A | 11/1995 |
| JP | 2011-095932 | 5/2011 |
| JP | 2012-033118 A | 2/2012 |
| JP | 2012-093802 | 5/2012 |

OTHER PUBLICATIONS

Office Action of Japanese Patent Application No. 2012-096051 dated Dec. 22, 2015 with Partial Translation.

* cited by examiner

*Primary Examiner* — Christopher R Lamb

(74) *Attorney, Agent, or Firm* — Maschoff Brennan

(57) ABSTRACT

A display device includes: an input controller configured to detect a first contact coordinate input by a drag operation on a touch panel on a surface of a display and record the first contact coordinate in a memory in association with an acquisition time of the first contact coordinate; and a display controller configured to calculate a second contact coordinate at a time preceding a current time by a given time based on the first contact coordinate and the acquisition time corresponding to the first contact coordinate and control a display operation on the display with defining the second contact coordinate as a display coordinate.

20 Claims, 10 Drawing Sheets

ILLUSTRATION DEMONSTRATING AN OVERVIEW OF THE DRAG OPERATION SEEN FROM THE SIDE THEREOF

SCHEMATIC DIAGRAM ILLUSTRATING AN EXEMPLARY HARDWARE
CONFIGURATION OF A DISPLAY DEVICE

SCHEMATIC DIAGRAM ILLUSTRATING AN EXEMPLARY FUNCTIONAL
BLOCK CONFIGURATION OF THE DISPLAY DEVICE

SCHEMATIC DIAGRAM ILLUSTRATING AN OVERVIEW OF AN OPERATIONAL INPUT
PROCESS ACCOMPANIED BY A DRAG OPERATION

ILLUSTRATION DEMONSTRATING AN OVERVIEW OF THE DRAG
OPERATION SEEN FROM THE SIDE THEREOF

SCHEMATIC DIAGRAM ILLUSTRATING AN OVERVIEW OF
A DISPLAY COORDINATE GENERATION PROCESS

SCHEMATIC DIAGRAM REPRESENTING A GRAPH MADE WHEN X-COORDINATES OF
CONTACT COORDINATES RECORDED IN A RAM ARE PLOTTED ON A TIME-SERIES BASIS

SCHEMATIC DIAGRAM REPRESENTING A GRAPH MADE WHEN Y-COORDINATES OF
CONTACT COORDINATES RECORDED IN THE RAM ARE PLOTTED ON A TIME-SERIES BASIS

SCHEMATIC DIAGRAM ILLUSTRATING A MANNER MADE WHEN A DISPLAY COORDINATE AT A TIME: TS IS SOUGHT

DISPLAY DEVICE, DISPLAY METHOD, AND RECORDING MEDIUM STORING DISPLAY PROGRAM

CROSS-REFERENCE TO RELATED APPLICATION(S)

This application is based upon and claims the benefit of priority of the prior Japanese Patent Application No. 2012-096051, filed on Apr. 19, 2012, the entire contents of which are incorporated herein by reference.

FIELD

The embodiments discussed herein are related to a display device performing scroll display, a display method, and a storage medium storing a display program.

BACKGROUND

While, in a communication device such as a mobile phone, a smartphone, a Personal Digital Assistant (PDA), or a Mobile Personal Computer (PC), a document or the like is displayed on a display, a user easily carries the communication device. The communication device is downsized, and a touch panel is adopted, for example, so as to reduce input devices such as keys. The touch panel is provided on a display. In the touch panel, a drag operation is performed where a fingertip is moved in a state of being in contact with a display screen.

A related art is disclosed in Japanese Laid-open Patent Publication No. 2012-33118.

SUMMARY

According to one aspect of the embodiments, a display device includes: an input controller configured to detect a first contact coordinate input by a drag operation on a touch panel on a surface of a display and record the first contact coordinate in a memory in association with an acquisition time of the first contact coordinate; and a display controller configured to calculate a second contact coordinate at a time preceding a current time by a given time based on the first contact coordinate and the acquisition time corresponding to the first contact coordinate and control a display operation on the display with defining the second contact coordinate as a display coordinate.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In a communication device where a touch panel is provided on a display, a document, a Web page, or the like whose display area is larger than the size of the display is displayed by scrolling of a drag operation. The scroll display by the drag operation is started based on the detection of a touch operation on the touch panel, for example, the detection of contact coordinates from the touch panel performed by a processor, and is terminated when a fingertip moves away from the touch panel.

In the scroll display triggered by the detection of the contact coordinates output from the touch panel, a time taken for display processing and the coordinate output period of the touch panel may not be equal to each other. Therefore, in the processor, due to a repeat of display processing at the time of the scroll display, a wait time for the output of the coordinate of the touch panel occurs. The time taken for the display processing may vary depending on the area of a display area newly displayed in response to the amount of change in a coordinate, the number of pieces of data of the display area, a time taken to load data, or the like. Therefore, the time taken to wait for the output of the coordinate of the touch panel may fluctuate during a drag operation time period.

When, based on the fluctuation of the time taken to wait for the coordinate output, the time taken for the display processing has become longer than the coordinate output period of the touch panel, the processor may perform the display processing using contact coordinates already input and reduce the waiting time. Since the continuation of the drag operation enlarges a difference between the contact coordinates and the scroll display coordinates, the scroll display may appear to be delayed.

When the display processing for the previous contact coordinates, for example, the last-input contact coordinates, has not been completed at the time of the output of the coordinate of the touch panel, the processor discards the previous contact coordinates so as to solve the delay of the scroll display. Therefore, the processor may acquire the latest contact coordinates and perform the display processing so as not to cause a delay. When the contact coordinates are discarded, a time taken to wait for the output of the subsequent coordinate may occur in the processor.

A load on the processor may fluctuate due to the fluctuation of the time taken to wait for the coordinate output. For example, when the load on the processor is small, a time delay from the input of the contact coordinates from the touch panel to the completion of the display processing is small. When the load on the processor is large, the time delay becomes large. Owing to the fluctuation of the time delay based on the fluctuation of the load on the processor, the deviation of the scroll display coordinates may occur.

Figure 1:
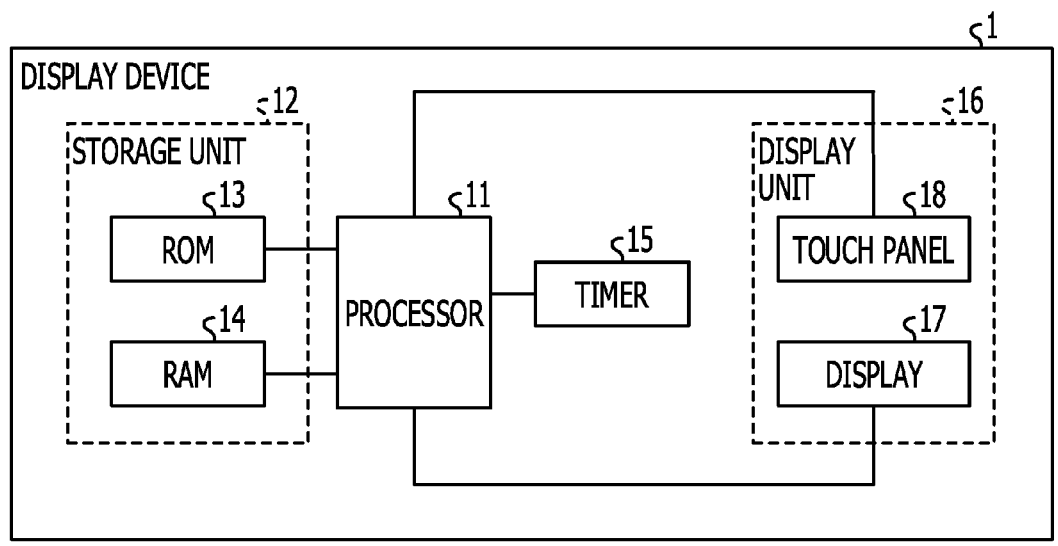
FIG. 1 illustrates an exemplary display device.

FIG. 1 illustrates an exemplary display device. FIG. 1 may illustrate the hardware configuration of a display device. A display device 1 illustrated in FIG. 1 includes a processor 11 corresponding to a Central Processing Unit (CPU) or a Field Programmable Gate Array (FPGA). The display device 1 includes a storage unit 12 including memories such as a Read Only Memory (ROM) 13 and a Random Access Memory (RAM) 14, a timer 15, and a display unit 16 including a display 17 and a touch panel 18.

The processor 11 is coupled to hardware within the display device 1, and controls the device entirely and executes a display program and the like. In the ROM 13 in the storage unit 12, a program such as a display program is stored. In the RAM 14, pieces of data obtained in the course of the processing, for example, contact coordinates and the acquisition time of the contact coordinates obtained from a timer signal output from the timer 15, are stored with being associated with each other. The processor 11 reads the display program from the ROM 13 and executes the scroll display. Based on the start of the drag operation, for example, based on the detection of the drag operation by the processor 11, the timer 15 outputs the timer signal indicating a time.

The display 17 in the display unit 16 performs processing for displaying a screen, based on control of the processor 11. The touch panel 18 is provided on the display surface of the display 17, and outputs a touch panel signal including contact coordinates indicating a contact position, based on the drag operation of a fingertip or the like. The touch panel signal may also be periodically output.

The display device 1 illustrated in FIG. 1 may be used for a mobile information terminal such as a mobile phone, a smartphone, a PDA, or a mobile PC or a computer such as a desktop personal computer or a notebook personal computer.

Figure 2:
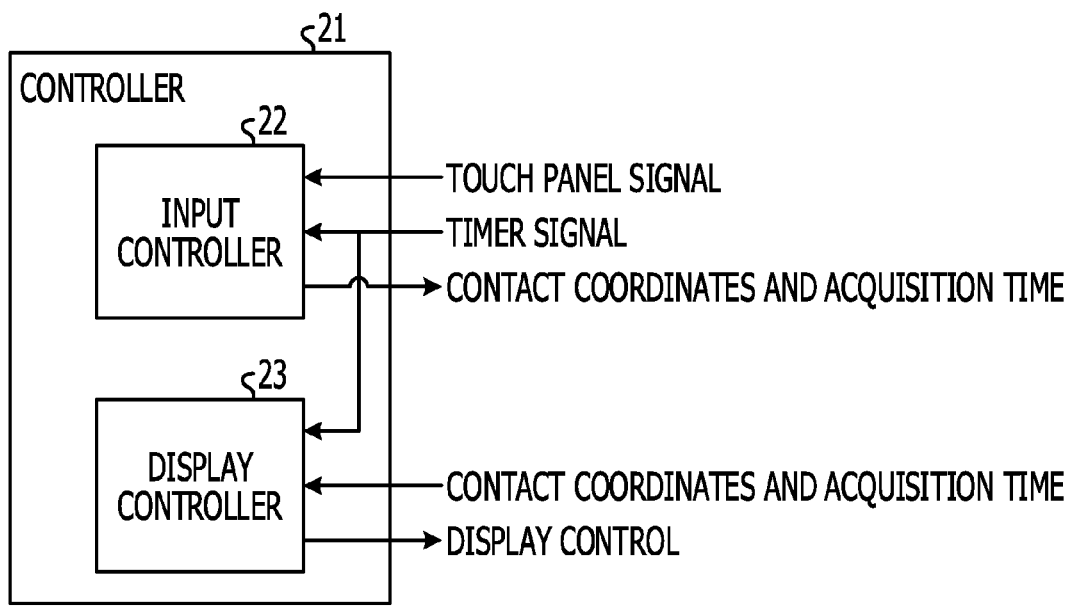
FIG. 2 illustrates an exemplary display device.

FIG. 2 illustrates an exemplary display device. FIG. 2 may illustrate the functional block of a display device. The processor 11 may operate as a controller 21 based on the execution of the display program. The controller 21 illustrated in FIG. 2 includes an input controller 22 and a display controller 23.

When, during the drag operation performed on the touch panel 18, having detected the touch panel signal in, for example, a given period, the input controller 22 extracts contact coordinates included in the touch panel signal. The input controller 22 stores the contact coordinates and the acquisition time of the contact coordinates obtained from the timer signal in the RAM 14 with associating the contact coordinates and the acquisition time with each other.

The display controller 23 may set the display area of a document, a Web page, or the like to be displayed in the display 17, extract a partial image within the display area, and cause the display 17 to display the partial image in full-screen. The display controller 23 changes display coordinates in response to the drag operation and performs trimming processing on the partial image so that the partial image within the display area is displayed in full-screen on the display 17 after the change of the display coordinates. For example, during the drag operation, based on the combination of the contact coordinates and the acquisition time of the coordinates, which are stored in the RAM 14, the display controller 23 repeats processing for obtaining new display coordinates and control of display at the obtained display coordinates every time processing for displaying the partial image at the obtained display coordinates is terminated.

In FIG. 1 and FIG. 2, a configuration or a function, which relates to the scroll display processing, may be illustrated, and the other configuration or the function of the display device 1 may be omitted.

Figure 3:
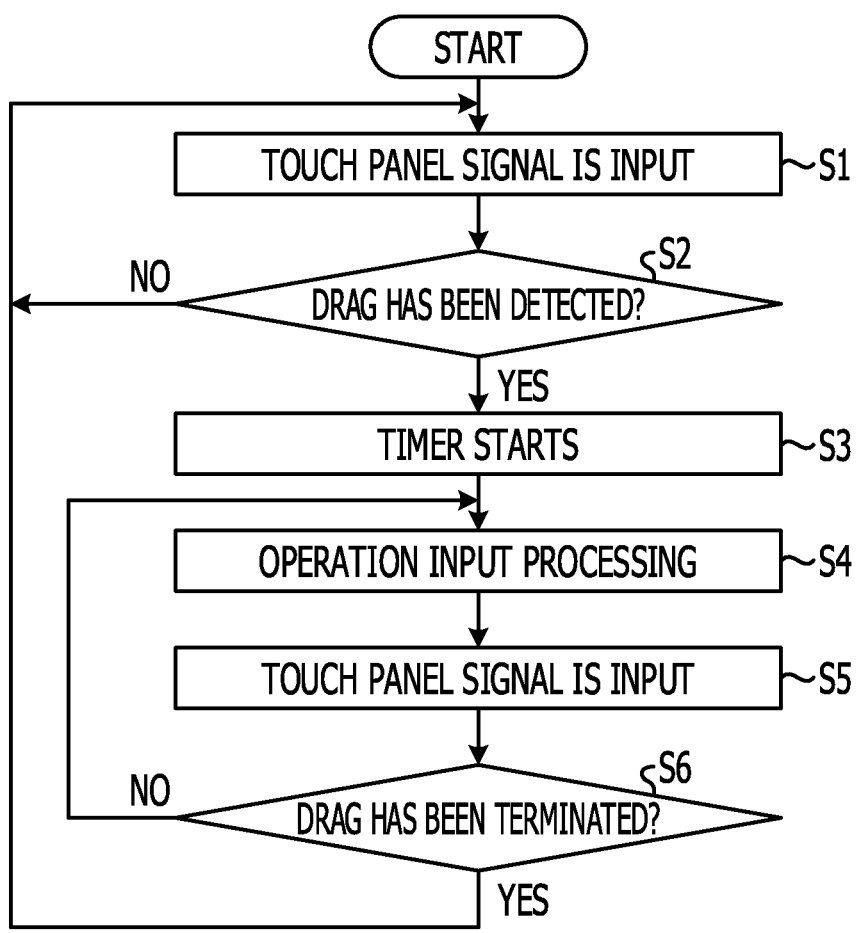
FIG. 3 illustrates an exemplary processing of an input controller.
Figure 4:
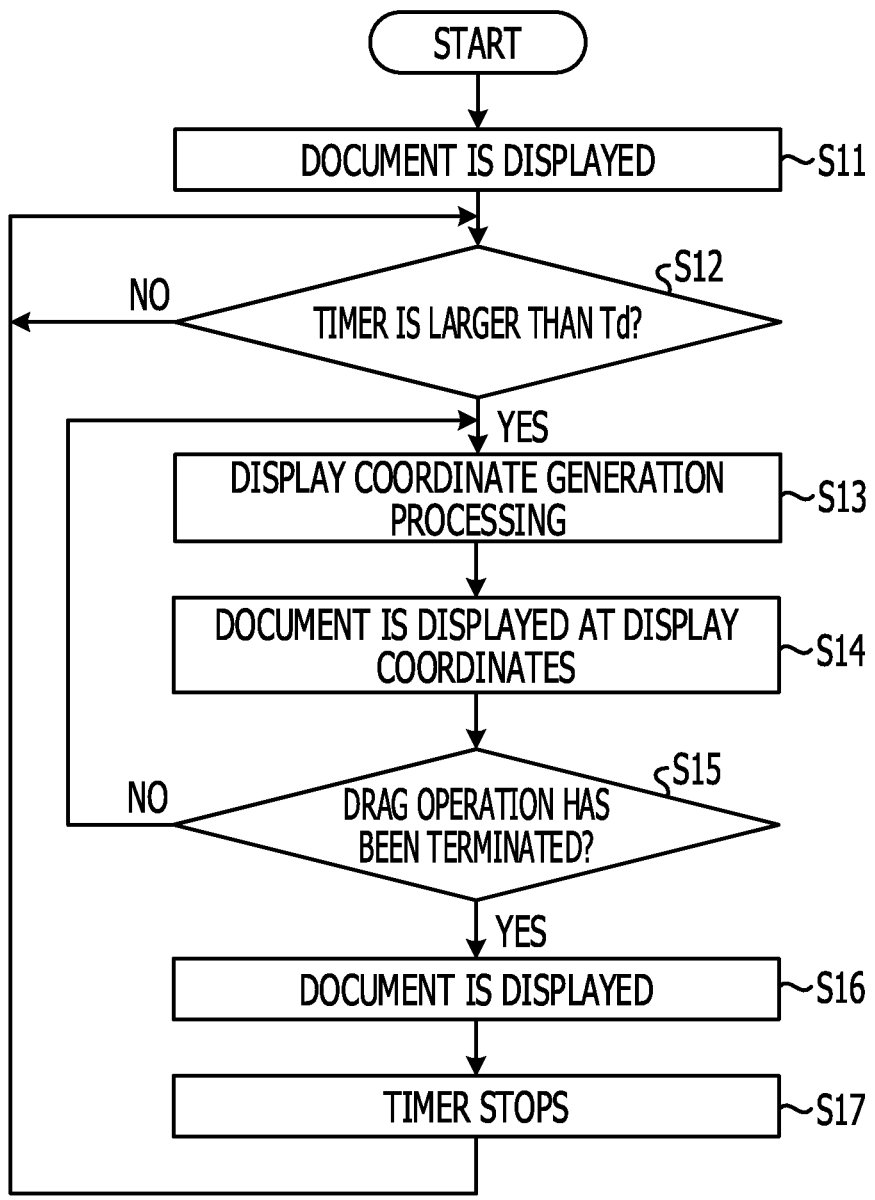
FIG. 4 illustrates an exemplary processing of a display controller.

For example, the scroll display processing by the controller 21 illustrated in FIG. 2 may be performed with the execution of the display program. FIG. 3 illustrates an exemplary processing of an input controller. An input controller illustrated in FIG. 3 may correspond to the input controller 22 illustrated in FIG. 2. FIG. 4 illustrates an exemplary processing of a display controller. A display controller illustrated in FIG. 4 may correspond to the display controller 23 illustrated in FIG. 2. Since the input controller 22 and the display controller 23 operate independently of each other without cooperating with each other, smooth scroll display processing may be performed. In an initial state, under a control of the display controller 23, the partial image of a document may be displayed in full-screen in the display 17 (S11), and a touch operation on the touch panel 18 may not be performed.

In the initial state, the input controller 22 waits for the touch operation on the touch panel 18 (S1, S2: No). When the drag operation has been detected after the input of the touch panel signal (S1, S2: Yes), the input controller 22 starts the timer 15 (S3).

The input controller 22 executes a given processing (S4). The input controller 22 may extract contact coordinates included in the touch panel signal at the time of the detection of the drag operation. The input controller 22 stores the extracted contact coordinates and the acquisition time of the contact coordinates obtained from the timer signal in the RAM 14 with associating the contact coordinates and the acquisition time with each other.

The input controller 22 waits for the input of the touch panel signal transmitted in a given period during the drag operation. Based on the input of the touch panel signal (S5, S6: No), the input controller 22 extracts the contact coordinates included in the touch panel signal, and records the extracted contact coordinates and the acquisition time of the contact coordinates obtained from the timer signal in the RAM 14 with associating the contact coordinates and the acquisition time with each other (S4).

Every time having received the touch panel signal transmitted in a given period during the drag operation (S6: No), the input controller 22 performs the operation S4, for example, records contact coordinates and the acquisition time of the contact coordinates in the RAM 14. When the termination of the drag operation has been detected (S6: Yes), the input controller 22 waits for a subsequent drag operation (S1, S2).

The display controller 23 separately operating without cooperating with the input controller 22 waits for the elapse of a time: Td with the start of the timer 15 being defined as a starting point (S12). The time: Td may be a fixed parameter. When the time: Td has elapsed with the start of the timer 15 being defined as a starting point, the display controller 23 generates display coordinates (S13). Based on the contact coordinates and the acquisition time associated with the contact coordinates, which are recorded in the RAM 14, the display controller 23 calculates contact coordinates at a time: Ts (Ts=Tc−Td) obtained by subtracting the time: Td from a current time: Tc.

The display controller 23 defines the obtained contact coordinates at the time: Ts as display coordinates, and performs control for displaying a document at the display coordinates (S14).

During a time period when the drag operation is performed (S15: No), each time the display control for the document has been completed, the display controller 23 repeats the processing operations in the operation S13 and the operation S14.

When the drag operation has been terminated (S15: Yes), the display controller 23 sets contact coordinates at a termination time, as final display coordinates, and performs control for displaying the document at the final display coordinates (S16). After the display control for the document has been completed, the display controller 23 halts the timer 15 (S17), and monitors the restarting of the timer 15 (S12).

Figure 5:
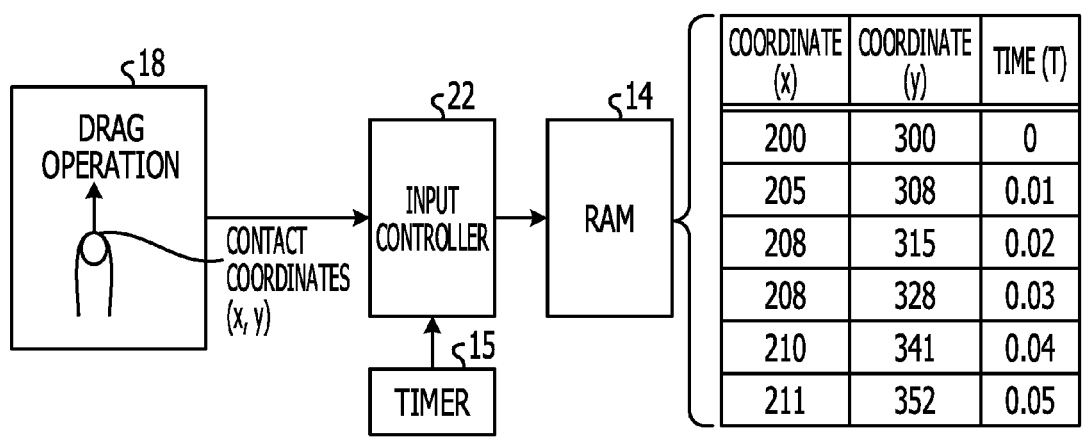
FIG. 5 illustrates an exemplary processing of a drag operation.
Figure 6:
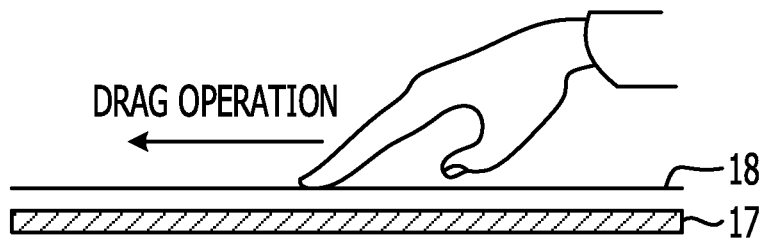
FIG. 6 illustrates an exemplary drag operation.

FIG. 5 illustrates an exemplary processing of a drag operation. Processing illustrated in FIG. 5 may correspond to the operation S4 illustrated in FIG. 3. FIG. 6 illustrates an exemplary drag operation. In FIG. 6, the side of a drag operation may be illustrated. The touch panel signal is output at the time of the sampling of coordinates during the drag operation. A sampling period may be fixed, and may be several milliseconds to several tens of milliseconds, for example. For example, when the display update rate of a display is 60 fps (frames per second: the number of frames displayed per second), the sampling period may be about 17 milliseconds.

As illustrated in FIG. 5 and FIG. 6, when the drag operation is performed on the touch panel 18, the input controller 22 extracts contact coordinates (x, y) from the touch panel signal input with respect to each sampling period. The contact coordinates (x, y) may be, for example, coordinates where total pixels (occasionally referred to as a resolution) used for display of 1280×768 or the like are expressed as coordinates.

The input controller 22 stores the contact coordinates (x, y) extracted from the touch panel signal and the acquisition time: Tin of the contact coordinates (x, y) obtained from the timer signal in the RAM 14 with associating the contact coordinates (x, y) and the acquisition time with each other. In FIG. 5, for example, the contact coordinates included in an initial touch panel signal at the time of the detection of the drag operation may be (200, 300), and the acquisition time: Tin of the contact coordinates may be 0 (millisecond). The contact coordinates included in a subsequent touch panel signal may be (205, 308), and the acquisition time: Tin of the contact coordinates may be 10 milliseconds. During the drag operation, for example, every 10 milliseconds, the contact coordinates (x, y) and the acquisition time: Tin of the contact coordinates are recorded in the RAM 14.

Figure 7:
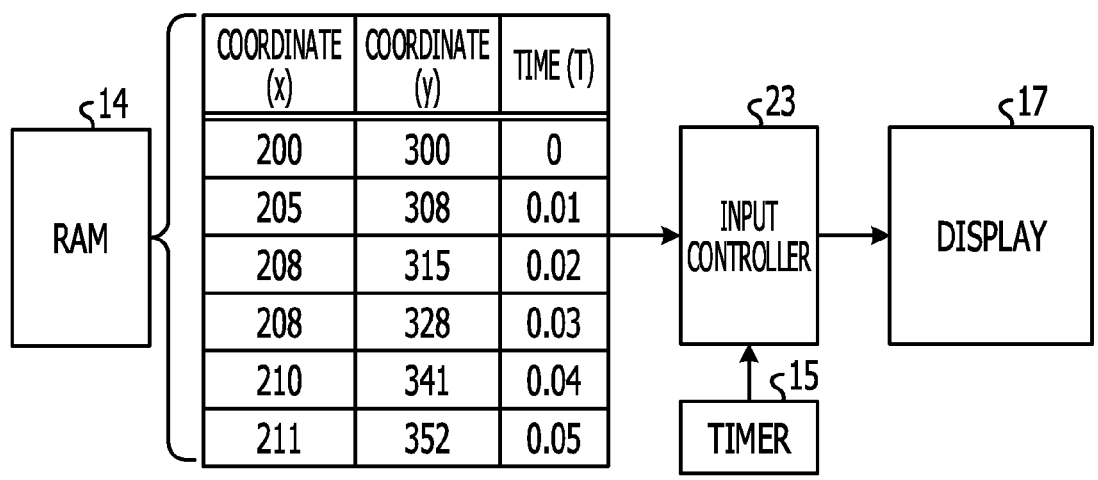
FIG. 7 illustrates an exemplary display coordinate generation processing.

FIG. 7 illustrates an exemplary display coordinate generation processing. Display coordinate generation processing illustrated in FIG. 7 may correspond to the display coordinate generation processing illustrated in FIG. 4.

Without operating simultaneously with the input controller 22, the display controller 23 starts the display coordinate generation processing when the time Td has elapsed with the start of the timer 15 being defined as a starting point. In the display coordinate generation processing, based on the contact coordinates (x, y) and the acquisition time: Tin associated with the contact coordinates, which are recorded in the RAM 14, the display controller 23 calculates contact coordinates at the time: Ts (Ts=Tc−Td) obtained by subtracting the time: Td from the current time: Tc.

Figure 8:
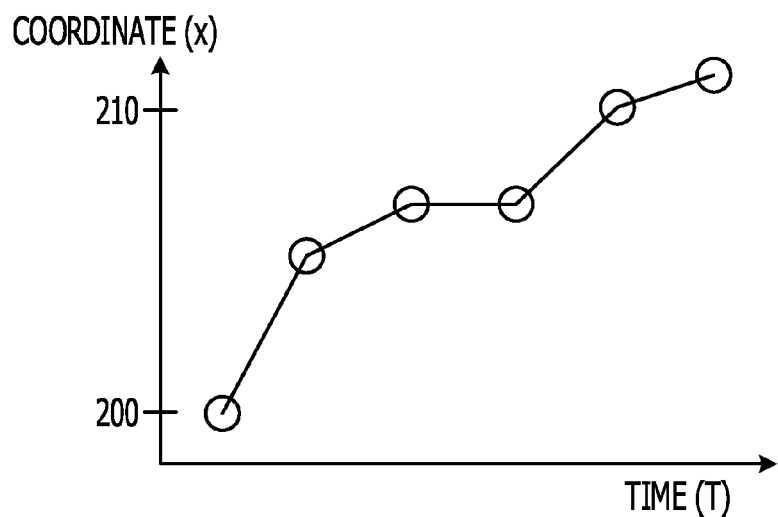
FIG. 8 illustrates an exemplary x-coordinate of contact coordinates.
Figure 9:
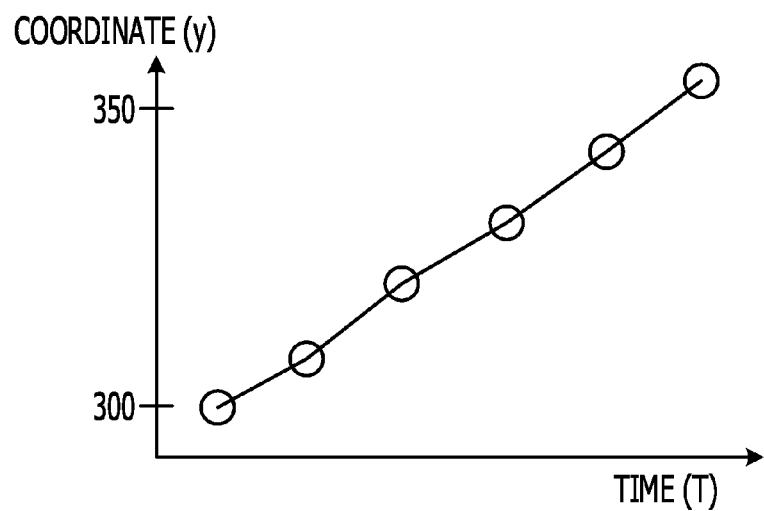
FIG. 9 illustrates an exemplary y-coordinate of contact coordinates.

FIG. 8 illustrates an exemplary x-coordinate of contact coordinates. In FIG. 8, a graph is illustrated where the x-coordinates of the contact coordinates recorded in the RAM 14 are plotted in chronological order. FIG. 9 illustrates an exemplary y-coordinate of contact coordinates. In FIG. 9, a graph is illustrated where the y-coordinates of the contact coordinates recorded in the RAM 14 are plotted in chronological order. When, for example, with respect to each acquisition time: Tin, the x-coordinate of the contact coordinates is plotted, the value of the x-coordinate at an arbitrary time: T may be obtained using an interpolation line coupling individual points (refer to symbols O in FIG. 8). When, with respect to each acquisition time: Tin, the y-coordinate of the contact coordinates is plotted, the value of the y-coordinate at an arbitrary time: T may be obtained using an interpolation line coupling individual points (refer to symbols O in FIG. 9). For example, the contact coordinates (x, y) at the time: Ts may be obtained using a piecewise linear interpolation (a linear spline interpolation: a so-called line graph).

For example, when the time: Ts is located between acquisition times: $T_{n-1}$ and $T_n$, contact coordinates at the acquisition time: $T_{n-1}$ are $(x_{n-1}, y_{n-1})$, and contact coordinates at the acquisition time: $T_n$ are $(x_n, y_n)$, contact coordinates (x, y) at the time: Ts are obtained in accordance with the following Expression (1).

$$x = \frac{x_n - x_{n-1}}{t_n - t_{n-1}}(Ts - t_{n-1}) + x_{n-1} \quad (1)$$
$$y = \frac{y_n - y_{n-1}}{t_n - t_{n-1}}(Ts - t_{n-1}) + y_{n-1}$$

Figure 10:
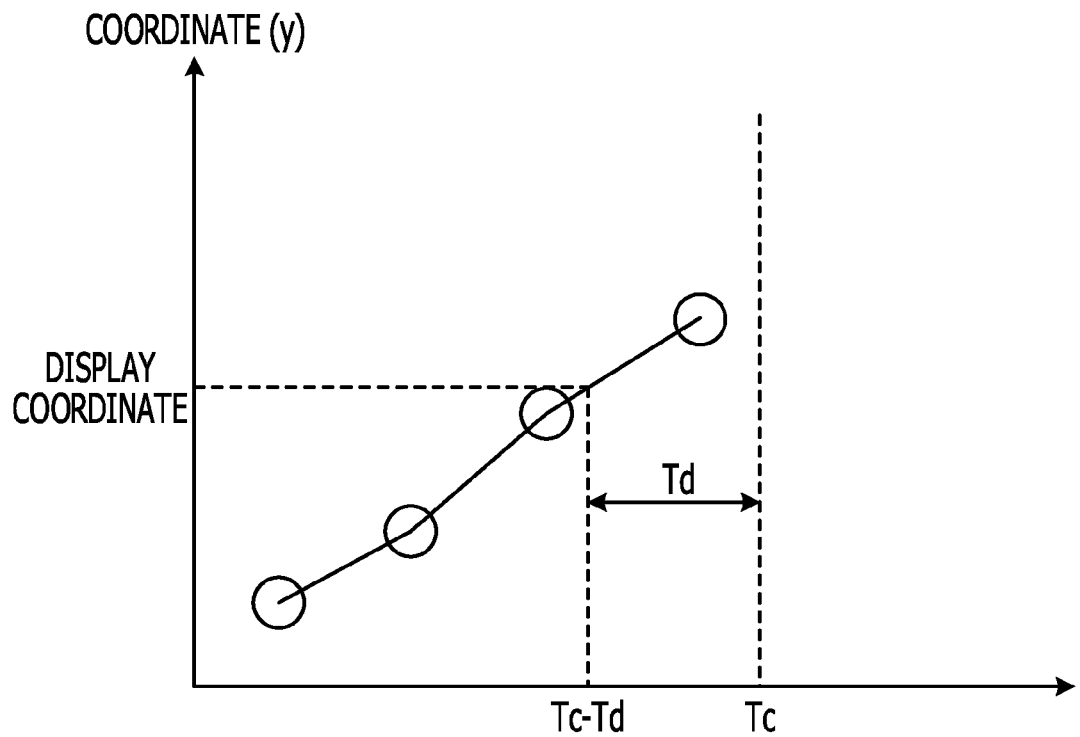
FIG. 10 illustrates an exemplary display coordinate.

The display controller 23 obtains the contact coordinates at the time: Ts using the Expression (1), and display-controls the display 17 with defining the contact coordinates as display coordinates. Since the control is repeated until the drag operation is terminated, the display controller 23 scrolls the document displayed in the display 17. FIG. 10 illustrates an exemplary display coordinate. In FIG. 10, a display coordinate (y-coordinate) at the time: Ts is obtained.

The time: Td may be set to a fixed value. For example, the time Td may be set to a value larger than the sampling period of contact coordinates during the drag operation. Since, as illustrated in FIG. 3 and FIG. 4, the time: Td corresponds to a delay time elapsing from the start of the drag operation to the start of the display processing, the time: Td may be set to a small value. For example, when the sampling period is about 17 milliseconds, the time: Td may be set to a value larger than 17 milliseconds, in consideration of a certain amount of margin for the stability of the touch panel device, the accuracy of the timer 15, the processing speed of the processor 11, the load tolerance of the whole device, or the like. Therefore, during the time period of the drag operation, the display controller 23 may stably set coordinates at a time preceding the contact coordinates by the time: Td, as the display coordinates.

In the display device 1, the input controller 22 detects the touch panel signal input by the drag operation in a given period, and records contact coordinates extracted from the touch panel signal and the acquisition time of the contact coordinates in the RAM 14 with associating the contact coordinates with the acquisition time. Based on the basis of the contact coordinates and the acquisition time of the contact coordinates, which are recorded in the RAM 14, the display controller 23 calculates contact coordinates at a time preceding a current time by the fixed time: Td. The calculated contact coordinates are set as the display coordinates, and the display 17 is display-controlled. The display controller 23 repeats the processing for calculating contact coordinates at a time preceding the current time by the fixed time: Td and the display control where the calculated contact coordinates are defined as the display coordinates, until the drag operation is terminated.

Therefore, the display control is performed without waiting for a coordinate output from the touch panel 18. For example, when the drag operation is continued, since a time difference between the contact coordinates and the display coordinates is substantially fixed, the scroll display may not appear to be delayed. Since the time difference between the contact coordinates and the display coordinates is substantially fixed, coordinates may not be discarded. The waiting for the output of coordinate of the touch panel and the fluctuation of the waiting time are reduced, and a load on the processor may become substantially fixed. Therefore, a time delay until the completion of the display processing may become substantially fixed. In the display device 1, the scroll display of the drag operation performed on the touch panel 18 may become smooth as if sticking to a fingertip. Since the scroll display becomes smooth, the visibility of contents displayed may be improved.

The linear spline interpolation may be used for obtaining contact coordinates at the time: Ts. As an interpolation line, a cubic spline interpolation may be used that is expresses by a continuous curved line.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display device comprising:
    a memory configured to store a program: and
    a processor communicatively coupled to the memory and configured to perform, in response to instructions included in the program, operations to:
        detect first contact coordinates input by a drag operation on a touch panel on a surface of a display and record the first contact coordinates in a memory in association with respective acquisition times of the first contact coordinates;
        calculate a second contact coordinate at a time ("Ts") that is between the acquisition times of the first contact coordinates, wherein the time Ts is obtained by subtracting a given time from a current time based on the first contact coordinates and the respective acquisition times and wherein the second contact coordinate is between the first contact coordinates and is obtained by an interpolation operation that includes:
            determining a rate of the drag operation between two first contact coordinates of the first contact coordinates based on the first contact coordinates and the respective acquisition times;
            determining an amount of time that has passed from an initial acquisition time ("$t_{n-1}$") to the time Ts, wherein the initial acquisition time $t_{n-1}$ corresponds to an initial first contact coordinate of the two first contact coordinates;
            determining a distance based on the determined rate of the drag operation and based on the determined amount of time that has passed from the initial acquisition time $t_{n-1}$ to the time Ts; and
            obtaining the second contact coordinate based on the determined distance and the initial first contact coordinate; and
        control a display operation on the display using the second contact coordinate as a display coordinate.

2. The display device according to claim 1, wherein the processor repeats the calculation for a new second contact coordinate and the control of the display operation.

3. The display device according to claim 1, wherein the processor sets, as the current time, a time when the control of the display operation has been completed.

4. The display device according to claim 1, wherein the processor starts the calculation after the given time has elapsed from the start of the timer, and halts the timer based on a completion of the drag operation.

5. The display device according to claim 1, wherein the given time is a constant value.

6. The display device according to claim 1, further comprising:
    a timer configured to start based on the drag operation.

7. The display device according to claim 1, wherein the given time is set to be larger than a sampling period of the first contact coordinates during the drag operation.

8. The display device according to claim 1, wherein determining the distance based on the determined rate of the drag operation and based on the determined amount of time that has passed from the initial acquisition time $t_{n-1}$ to the time Ts includes multiplying the rate of the drag operation by the determined amount of time that has passed from the initial acquisition time $t_{n-1}$ to the time Ts.

9. A display method comprising:
    detecting, by a processor in a display device, first contact coordinates input by a drag operation on a touch panel on a surface of a display;
    recording the first contact coordinates in a memory in association with respective acquisition times of the first contact coordinates;
    calculating a second contact coordinate at a time ("Ts") that is between the acquisition times of the first contact coordinates, wherein the time Ts is obtained by subtracting a given time from a current time based on the first contact coordinates and the respective acquisition times, and wherein the second contact coordinate is obtained by an interpolation operation that includes:
        determining a rate of the drag operation between two first contact coordinates of the first contact coordinates based on the first contact coordinates and the respective acquisition times;
        determining an amount of time that has passed from an initial acquisition time ("$t_{n-1}$") to the time Ts, wherein the initial acquisition time $t_{n-1}$ corresponds to an initial first contact coordinate of the two first contact coordinates;
        determining a distance based on the determined rate of the drag operation and based on the determined amount of time that has passed from the initial acquisition time $t_{n-1}$ to the time Ts; and
        obtaining the second contact coordinate based on the determined distance and the initial first contact coordinate; and
    performing a display operation on the display using the second contact coordinate as a display coordinate.

10. The display method according to claim 9, further comprising: scrolling a display image on the basis of the first contact coordinate.

11. The display method according to claim 9, further comprising:
    starting calculating the second contact coordinate after the given time has elapsed from the start of the timer; and
    halting the timer based on a completion of the drag operation.

12. The display method according to claim 9, further comprising: starting a timer based on start of the drag operation.

13. The display method according to claim 9, wherein the given time is set to be larger than a sampling period of the first contact coordinates during the drag operation.

14. The display method according to claim 9, wherein determining the distance based on the determined rate of the drag operation and based on the determined amount of time that has passed from the initial acquisition time $t_{n-1}$ to the time Ts includes multiplying the rate of the drag operation by the determined amount of time that has passed from the initial acquisition time $t_{n-1}$ to the time Ts.

15. A non-transitory recording medium storing a display program that includes codes for causing a processor in a display device to execute operations of:

detecting first contact coordinates input by a drag operation on a touch panel on a surface of a display;

recording the first contact coordinates in a memory in association with respective acquisition times of the first contact coordinates;

calculating a second contact coordinate at a time ("Ts") that is between the acquisition times of the first contact coordinates, wherein the time Ts is obtained by subtracting a given time from a current time based on the first contact coordinates and the respective acquisition times and wherein the second contact coordinate is obtained by an interpolation operation that includes:

determining a rate of the drag operation between two first contact coordinates of the first contact coordinates based on the first contact coordinates and the respective acquisition times;

determining an amount of time that has passed from an initial acquisition time ("$t_{n-1}$") to the time Ts, wherein the initial acquisition time $t_{n-1}$ corresponds to an initial first contact coordinate of the two first contact coordinates;

determining a distance based on the determined rate of the drag operation and based on the determined amount of time that has passed from the initial acquisition time $t_{n-1}$ to the time Ts; and obtaining the second contact coordinate based on the determined distance and the initial first contact coordinate; and performing a display operation on the display using the second contact coordinate as a display coordinate.

16. The non-transitory recording medium according to claim 15, wherein the operations include scrolling a display image on the basis of the first contact coordinate.

17. The non-transitory recording medium according to claim 15, wherein the operations include starting calculating the second contact coordinate after the given time has elapsed from the start of the timer; and halting the timer based on a completion of the drag operation.

18. The non-transitory recording medium according to claim 15, wherein the operations further include starting a timer based on start of the drag operation.

19. The non-transitory recording medium according to claim 15, wherein the given time is set to be larger than a sampling period of the first contact coordinates during the drag operation.

20. The non-transitory recording medium according to claim 15, wherein determining the distance based on the determined rate of the drag operation and based on the determined amount of time that has passed from the initial acquisition time $t_{n-1}$ to the time Ts includes multiplying the rate of the drag operation by the determined amount of time that has passed from the initial acquisition time $t_{n-1}$ to the time Ts.

* * * * *